(No Model.)

F. G. BOTSFORD.
PIPE COUPLING.

No. 414,855. Patented Nov. 12, 1889.

Witnesses.
Chas. J. Buchheit
Theo. L. Popps

F. G. Botsford
Inventor.
By Wilhelm Bonner
Attorneys.

UNITED STATES PATENT OFFICE.

FREDERICK G. BOTSFORD, OF ERIE, PENNSYLVANIA, ASSIGNOR OF THREE-FOURTHS TO JOSIAH N. HURST, OF WEST DOVER, OHIO, AND CLARENCE M. BRYANT, OF BUFFALO, NEW YORK.

PIPE-COUPLING.

SPECIFICATION forming part of Letters Patent No. 414,855, dated November 12, 1889.

Application filed September 25, 1888. Serial No. 286,315. (No model.)

*To all whom it may concern:*

Be it known that I, FREDERICK G. BOTSFORD, of Erie, in the county of Erie and State of Pennsylvania, have invented new and useful Improvements in Pipe-Couplings, of which the following is a specification.

This invention relates more particularly to the couplings which are employed on railway-cars for connecting the ends of the heating or steam pipes leading to the heaters or radiators.

The object of my invention is to provide a simple coupling of this character whereby the ends of the pipes are firmly and tightly connected together and whereby the pipes can be quickly coupled and uncoupled.

The invention consists of the improvements which will be hereinafter fully described, and pointed out in the claims.

Figure 1:
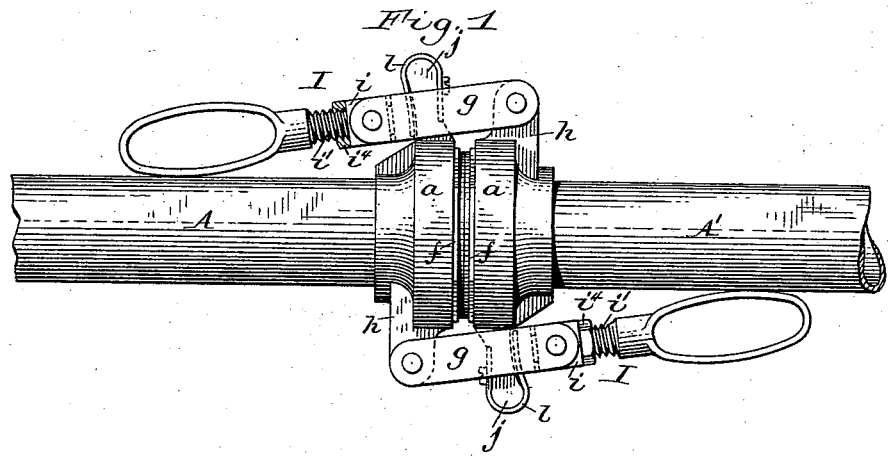
Figure 2:
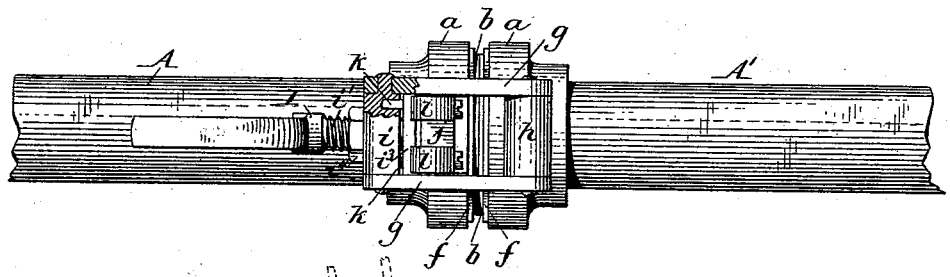
Figure 3:
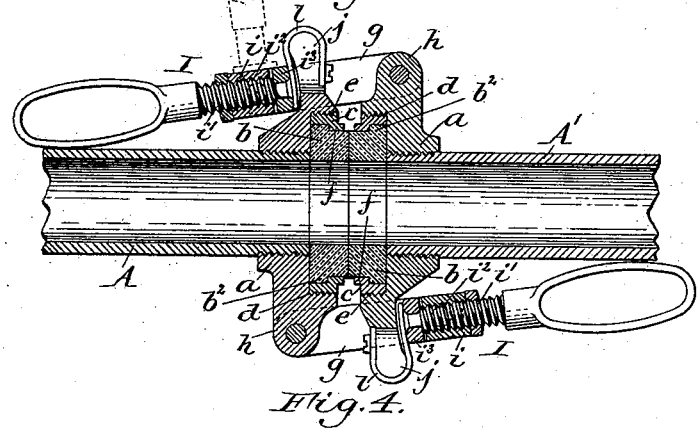
Figure 4:
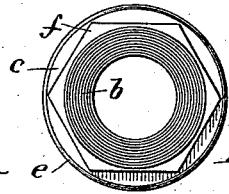

In the accompanying drawings, Figure 1 is a side elevation of my improved coupling. Fig. 2 is a top plan view thereof, partly in section. Fig. 3 is a longitudinal section of the coupling. Fig. 4 is an end view of one of the packing-rings and its clamping-ring.

Like letters of reference refer to like parts in the several figures.

A A' represent two adjacent steam or heating pipes, each of which is provided at its end with a collar or head $a$, which is secured to the pipe preferably by a screw-thread, as shown in Fig. 3. The head or collar of each pipe is provided at its outer end with a packing ring or gasket $b$, which projects beyond the outer face of the head. This packing-ring is secured to each head by a clamping nut or ring $c$, seated in a screw-threaded socket $d$, formed in the outer face of the head and provided with an external screw-thread $e$, which engages with the threaded socket. Each packing-ring $b$ is provided at its inner end with a projecting annular rim $b^2$, and is confined within the head $a$ by an inwardly-projecting annular flange $f$, formed at the outer end of the clamping-ring $c$ and overlapping the rim of the packing-ring, as represented in Fig. 3. This construction permits the packing-rings to be readily renewed when worn by unscrewing the clamping-rings $c$. The outer portions of the clamping-rings are made flat-sided, as shown in Fig. 4, so that they can be turned by a suitable wrench.

$g\ g$ represent connecting-links pivoted at their inner ends to lugs $h$, formed on one side of each head $a\ a$, and I I represent locking-levers pivoted between the outer ends of the links $g\ g$ and each bearing with its inner end against the outer side of a lug or ear $j$, formed on the head of the adjacent pipe. The head of each pipe is provided with a pair of lugs $h\ j$, arranged on diametrically-opposite sides of the head.

The locking-levers I I each consist of a cross-bar or yoke $i$, pivoted between the outer ends of the links $g\ g$, an arm or lever having a screw-threaded shank $i'$, which is adjustably arranged in a threaded opening $i^2$, formed centrally in the cross-bar or yoke $i$, and a bearing-piece $i^3$, arranged at the inner end of the shank $i'$ and adapted to bear against the lug $j$ of the opposing head. The bearing-piece $i^3$ is held against turning by being arranged between the links $g\ g$, and is compelled to move toward and from the lug $j$ with the screw-threaded shank $i'$ upon turning the lever I. The bearing-piece $i^3$ is further guided by pins $k$, secured to the yoke $i$ and arranged in openings or recesses formed in the bearing-piece, as represented in Fig. 2.

When the parts of the coupling become loose by the wear of the contiguous surfaces of the packing or from other causes, the parts can be readily tightened and the wear taken up by turning the levers I in the proper direction to move the bearing-pieces $i^3$ toward the lugs $j$. The screw-shanks $i'$ of the levers I are preferably provided with jam-nuts $i^4$, which bear against the yoke $i$, and whereby the levers are held against turning after being adjusted.

$l$ represents flat springs secured to the lugs $j$ and having their free ends arranged on the rear side of the lugs. These springs bear against the bearing-pieces $i^3$ when the pipes are coupled and assist in maintaining a tight contact between these parts and prevent the locking-levers from being disconnected from the lugs $j$ by the jarring of the car.

The pipes are coupled together by swinging the locking levers I outwardly at an angle to the links $g$, as represented by dotted lines in Fig. 3, and then moving the levers inwardly, so that the bearing-pieces $i^3$ engage behind the lugs $j$ of the opposing pipe. The locking-levers are then swung in line with the links, whereby the heads $a\ a$ are drawn together and the packing-rings $b\ b$ firmly forced against each other and a tight joint formed.

I claim as my invention—

1. The combination, with two adjacent pipes provided at their ends with heads or collars, of a pair of links $g$, pivoted at their inner ends to the head of one of said pipes, a pivoted yoke or cross-bar $i$, arranged between the outer ends of said links and provided with a screw-threaded opening, a locking-lever I, provided with a screw-threaded shank arranged in said threaded opening, and a bearing-piece $i^3$, attached to the inner end of said lever and adapted to engage behind a lug on the head of the opposing pipe, substantially as set forth.

2. In a pipe-coupling, the combination, with the heads $a$, each provided with a lug $j$ and a lug $h$, arranged diametrically opposite each other, of springs $l$, secured to the lugs $j$, links $g$, pivoted at their inner ends to the lugs $h$, and locking-levers I, pivoted to the outer ends of the links and adapted to engage over the lugs $j$ and bear against the springs $l$, substantially as set forth.

Witness my hand this 8th day of September, 1888.

FREDERICK G. BOTSFORD.

Witnesses:
 JNO. J. BONNER,
 CARL F. GEYER.